US007826621B2

(12) United States Patent
Barnhill et al.

(10) Patent No.: US 7,826,621 B2
(45) **Date of Patent: *Nov. 2, 2010**

(54) CONFIGURABLE FILTER FOR PROCESSING TELEVISION AUDIO SIGNALS

(75) Inventors: Matthew Barnhill, Duluth, GA (US); Roger Darr, Suwanee, GA (US)

(73) Assignee: THAT Corporation, Milford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/471,946

(22) Filed: May 26, 2009

(65) Prior Publication Data

US 2009/0231491 A1 Sep. 17, 2009

Related U.S. Application Data

(63) Continuation of application No. 11/089,385, filed on Mar. 24, 2005, now Pat. No. 7,539,316.

(60) Provisional application No. 60/555,583, filed on Mar. 24, 2004.

(51) Int. Cl.

*H04R 5/00* (2006.01)
*H04H 20/47* (2008.01)
*H04H 20/48* (2008.01)
*H04N 7/00* (2006.01)
*H04N 5/60* (2006.01)

(52) U.S. Cl. .................. 381/23; 381/2; 381/4; 381/22; 348/481; 348/484; 348/485; 348/738

(58) Field of Classification Search ................ 381/2–4, 381/22, 23; 348/481–485, 738
See application file for complete search history.

(56) References Cited

U.S. PATENT DOCUMENTS 5,796,842 A * 8/1998 Hanna .......................... 381/4
6,259,482 B1 * 7/2001 Easley et al. ................ 348/485

* cited by examiner

*Primary Examiner*—Devona E Faulk
(74) *Attorney, Agent, or Firm*—McDermott Will & Emery LLP

(57) ABSTRACT

A television audio signal encoder includes a matrix that sums a left channel audio signal and a right channel audio signal to produce a sum signal. The matrix also subtracts one of the left and right audio signals from the other to produce a difference signal. The encoder also includes a configurable infinite impulse response digital filter that selectively uses one or more sets of filter coefficients to filter the difference signal. Each selectable set of filter coefficients is associated with a unique filtering application to prepare the difference signal for transmission.

50 Claims, 8 Drawing Sheets

CONFIGURABLE FILTER FOR PROCESSING TELEVISION AUDIO SIGNALS

RELATED APPLICATION AND TECHNICAL FIELD

This present application is continuation of U.S. application Ser. No. 11/089,385, filed Mar. 24, 2005 (now U.S. Pat. No. 7,539,316), which claims priority under 35 U.S.C. §119 (e) of U.S. Provisional Patent Application Ser. No. 60/555,583, filed Mar. 24, 2004; the entire contents of both of which applications are incorporated herein by reference.

This disclosure relates to processing television audio signals and, more particularly, to a configurable filter for use with encoding and decoding television audio signals.

BACKGROUND

In 1984, the United States, under the auspices of the Federal Communications Commission, adopted a standard for the transmission and reception of stereo audio for television. This standard is codified in the FCC's Bulletin OET-60, and is often called the BTSC system after the Broadcast Television Systems Committee that proposed it, or the MTS (Multichannel Television Sound) system.

Prior to the BTSC system, broadcast television audio was monophonic, consisting of a single "channel" or signal of audio content. Stereo audio typically requires the transmission of two independent audio channels, and receivers capable of detecting and recovering both channels. In order to meet the FCC's requirement that the new transmission standard be 'compatible' with existing monophonic television sets (i.e., that mono receivers be capable of reproducing an appropriate audio signal from the new type of stereo broadcast), the Broadcast Television Systems Committee adopted an approach similar to FM radio systems: stereo Left and Right audio signals are combined to form two new signals, a Sum signal and a Difference signal.

Monophonic television receivers detect and demodulate only the Sum signal, consisting of the addition of the Left and Right stereo signals. Stereo-capable receivers receive both the Sum and the Difference signals, recombining the signals to extract the original stereo Left and Right signals.

For transmission, the Sum signal directly modulates the aural FM carrier just as would a monophonic audio signal. The Difference channel, however, is first modulated onto an AM subcarrier located 31.768 kHz above the aural carrier's center frequency. The nature of FM modulation is such that background noise increases by 3 decibel (dB) per octave, and as a result, because the new subcarrier is located further from the aural carrier's center frequency than the Sum or mono signal, additional noise is introduced into the Difference channel, and hence into the recovered stereo signal. In many circumstances, in fact, this rising noise characteristic renders the stereo signal too noisy to meet the requirements imposed by the FCC, and so the BTSC system mandates a noise reduction system in the Difference channel signal path.

This system, sometimes referred to as dbx noise reduction (after the company that developed the technique) is of the companding type, comprising an encoder and decoder. The encoder adaptively filters the Difference signal prior to transmission such that amplitude and frequency content, upon decoding, hide ("mask") noise picked up during the transmission process. The decoder completes the process by restoring the Difference signal to original form and thereby ensuring that noise is audibly masked by the signal content.

The dbx noise reduction system is also used to encode and decode Secondary Audio Programming (SAP) signals, which is defined in the BTSC standard as an additional information channel and is often used to e.g., carry programming in an alternative language, reading services for the blind, or other services.

Cost is, of course, of prime concern to television manufacturers. As a result of intense competition and consumer expectations, profit margins on consumer electronics products, especially television products, can be vanishingly small. Because the dbx decoder is located in the television receiver, manufacturers are sensitive to the cost of the decoder, and reducing the cost of the decoder is a necessary and worthwhile goal. While the encoder is not located in a television receiver and is not as sensitive from a profit standpoint, any development which will decrease manufacturing costs of the encoder also provides a benefit.

SUMMARY OF THE DISCLOSURE

In accordance with an aspect of the disclosure, a television audio signal encoder includes a matrix that sums a left channel audio signal and a right channel audio signal to produce a sum signal. The matrix also subtracts one of the left and right audio signals from the other to produce a difference signal. The encoder also includes a configurable infinite impulse response digital filter that selectively uses one or more sets of filter coefficients to filter the difference signal. Each selectable set of filter coefficients is associated with a unique filtering application to prepare the difference signal for transmission.

In one embodiment, the configurable infinite impulse response digital filter may include a selector that selects one of the one or more sets of filter coefficients. The configurable infinite impulse response digital filter may include a selector that selects an input signal from a group of input signals. One input signal from the group of input signals may include an output signal of the configurable infinite impulse response digital filter. The configurable infinite impulse response digital filter may be a second order infinite impulse response filter. Furthermore, the configurable infinite impulse response digital filter may be configured as a low pass filter, a high pass filter, bandpass filter, an emphasis filter, etc. The selection of the filter coefficients may based on a rate that the television audio signal is sampled. The sets of filter coefficients may be stored in a memory or in a look-up table that is stored in memory. The television audio signal may comply to the Broadcast Television System Committee (BTSC) standard, the Near Instantaneously Companded Audio Multiplex (NICAM) standard, the A2/Zweiton standard, the EIA-J standard, or other similar audio standard. The configurable infinite impulse response digital filter may be implemented in an integrated circuit.

In accordance with another aspect of the disclosure, a television audio signal decoder includes a configurable infinite impulse response digital filter that selectively uses one or more sets of filter coefficients to filter a difference signal. The difference signal is produced by subtracting one of a left channel and a right channel audio signal from the other audio signal. Each selectable set of filter coefficients is associated with a unique filtering application to prepare the difference signal for separating the left channel and right channel audio signals. The decoder also includes a matrix that separates the left channel and right channel audio signals from the difference signal and a sum signal. The sum signal includes the sum the left channel audio signal and the right channel audio signal.

In one embodiment, the configurable infinite impulse response digital filter may include a selector that selects one of the one or more sets of filter coefficients. The configurable infinite impulse response digital filter may include a selector that selects an input signal from a group of input signals. One input signal from the group of input signals may include an output signal of the configurable infinite impulse response digital filter. The configurable infinite impulse response digital filter may be a second order infinite impulse response filter. Furthermore, the configurable infinite impulse response digital filter may be configured as a low pass filter, a high pass filter, bandpass filter, an emphasis filter, etc. The selection of the filter coefficients may based on a rate that the television audio signal is sampled. The sets of filter coefficients may be stored in a memory or in a look-up table that is stored in memory. The television audio signal may comply to the Broadcast Television System Committee (BTSC) standard, the Near Instantaneously Companded Audio Multiplex (NICAM) standard, the A2/Zweiton standard, the EIA-J standard, or other similar audio standard. The configurable infinite impulse response digital filter may be implemented in an integrated circuit.

In accordance with another aspect of the disclosure, a digital BTSC signal encoder for encoding digital left and right channel audio signals so that the encoded left and right channel audio signals can be subsequently decoded so as to reproduce the digital left and right channel audio signals with little or no distortion of the signal content of the digital left and right channel audio signals includes, a matrix that sums the left channel audio signal and the right channel audio signal to produce a sum signal. The matrix also subtracts one of the left and right audio signals from the other to produce a difference signal. The BTSC encoder also includes a configurable infinite impulse response digital filter that selectively uses one or more sets of filter coefficients to filter the difference signal. Each selectable set of filter coefficients is associated with a unique filtering application to prepare the difference signal for transmission and to comply with the BTSC standard.

In one embodiment, the configurable infinite impulse response digital filter may include a selector that selects one of the one or more sets of filter coefficients. The configurable infinite impulse response digital filter may include a selector that selects an input signal from a group of input signals. One input signal from the group of input signals may include an output signal of the configurable infinite impulse response digital filter. The configurable infinite impulse response digital filter may be a second order infinite impulse response filter. Furthermore, the configurable infinite impulse response digital filter may be configured as a low pass filter, a high pass filter, bandpass filter, an emphasis filter, etc. The selection of the filter coefficients may based on a rate that the television audio signal is sampled. The sets of filter coefficients may be stored in a memory or in a look-up table that is stored in memory.

In accordance with another aspect of the disclosure, a digital BTSC signal decoder for decoding digital left and right channel audio signals with little or no distortion of the signal content of the digital left and right channel audio signals, includes, a configurable infinite impulse response digital filter that selectively uses one or more sets of filter coefficients to filter a difference signal that complies with the BTSC standard. The difference signal is produced by subtracting one of a left channel and a right channel audio signal from the other audio signal. Each selectable set of filter coefficients is associated with a unique filtering application to prepare the difference signal for separating the left channel and right channel audio signals. BTSC signal decoder also includes a matrix that separates the left channel and right channel audio signals from the difference signal and a sum signal. The sum signal includes the sum the left channel audio signal and the right channel audio signal.

In one embodiment, the configurable infinite impulse response digital filter may include a selector that selects one of the one or more sets of filter coefficients. The configurable infinite impulse response digital filter may include a selector that selects an input signal from a group of input signals. One input signal from the group of input signals may include an output signal of the configurable infinite impulse response digital filter. The configurable infinite impulse response digital filter may be a second order infinite impulse response filter. Furthermore, the configurable infinite impulse response digital filter may be configured as a low pass filter, a high pass filter, bandpass filter, an emphasis filter, etc. The selection of the filter coefficients may based on a rate that the television audio signal is sampled. The sets of filter coefficients may be stored in a memory or in a look-up table that is stored in memory.

In accordance with another aspect of the disclosure, a computer program product residing on a computer readable medium has stored instructions that when executed by a processor, cause the processor to sum a left channel audio signal and a right channel audio signal to produce a sum signal. Executed instructions also cause the processor to subtract one of the left and right audio signals from the other signal to produce a difference signal. Furthermore, executed instructions cause the processor to select one or more sets of filter coefficients to filter the difference signal with a configurable infinite impulse response digital filter. Each selectable set of filter coefficients is associated with a unique filtering application to prepare the difference signal for transmission.

In one embodiment, the computer program product further includes instructions that, when executed, may select an input signal from a group of input signals.

In accordance with another aspect of the disclosure, a computer program product residing on a computer readable medium stores instructions which, when executed by a processor, cause that processor to select one or more sets of filter coefficients to filter a difference signal with an infinite impulse response digital filter. The difference signal is produced by subtracting one of a left channel and a right channel audio signal from the other audio signal. The selectable set of filter coefficients is associated with a unique filtering application to prepare the difference signal for separating the left channel and right channel audio signals. Executed instructions also cause the processor to separate the left channel and right channel audio signals from the difference signal and a sum signal. The sum signal includes the sum the left channel audio signal and the right channel audio signal.

In one embodiment, the computer program product further includes instructions that, when executed, may select an input signal from a group of input signals.

In accordance with another aspect of the disclosure, a television audio signal encoder includes an input stage that receives a secondary audio programming signal. The television audio signal encoder also includes a configurable infinite impulse response digital filter that selectively uses one or more sets of filter coefficients to filter the secondary audio programming signal. Each selectable set of filter coefficients is associated with a unique filtering application to prepare the secondary audio programming signal for transmission.

In one embodiment, the configurable infinite impulse response digital filter may include a selector that selects one of the one or more sets of filter coefficients. The configurable infinite impulse response digital filter may include a selector to select an input signal from a group of input signals. One input signal from the group of input signals may include an output signal of the configurable infinite impulse response digital filter. The configurable infinite impulse response digital filter may be a second order infinite impulse response filter.

In accordance with another aspect of the disclosure, a television audio signal decoder includes a configurable infinite impulse response digital filter that selectively uses one or more sets of filter coefficients to filter a secondary audio programming signal. Each selectable set of filter coefficients is associated with a unique filtering application to prepare the secondary audio programming signal for a television receiver system.

In one embodiment, the configurable infinite impulse response digital filter may include a selector that selects one of the one or more sets of filter coefficients. The configurable infinite impulse response digital filter may include a selector to select an input signal from a group of input signals. One input signal from the group of input signals may include an output signal of the configurable infinite impulse response digital filter. The configurable infinite impulse response digital filter may be a second order infinite impulse response filter.

Additional advantages and aspects of the present disclosure will become readily apparent to those skilled in the art from the following detailed description, wherein embodiments of the present invention are shown and described, simply by way of illustration of the best mode contemplated for practicing the present invention. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

DETAILED DESCRIPTION OF THE EMBODIMENTS

Figure 1:
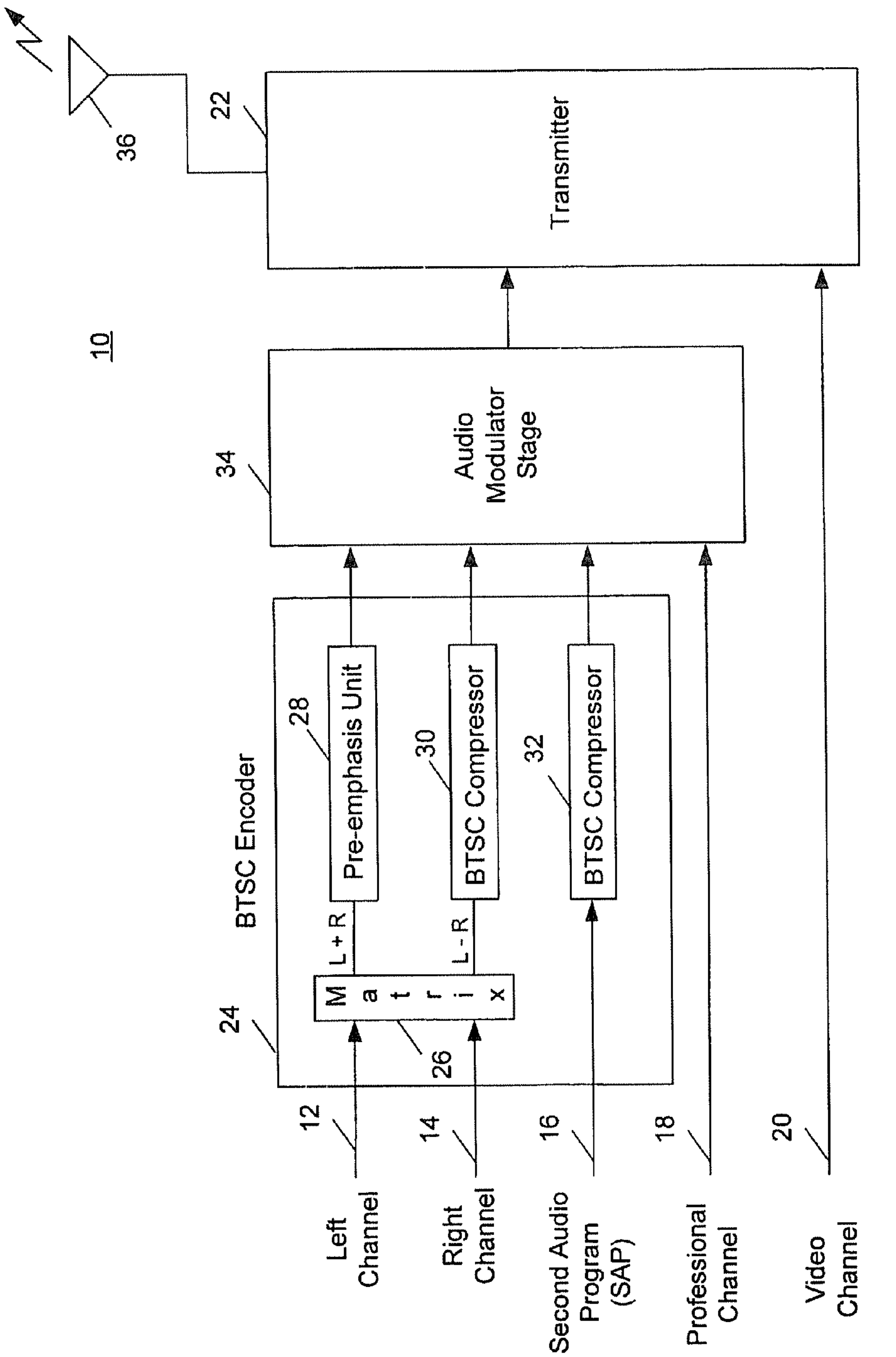
FIG. 1 is a block diagram representing a television signal transmission system that is configured to comply with the BTSC television audio signal standard.

Referring to FIG. 1, a functional block diagram of a BTSC compatible television signal transmitter 10 includes five lines (e.g., conductive wires, cables, etc.) that provide signals for transmission. In particular, left and right audio channels are provided on respective lines 12 and 14. An SAP signal is provided by line 16 in which the signal has content to provide additional channel information (e.g., alternative languages, etc.). A fourth line 18 provides a professional channel that is typically used by broadcast television and cable television companies. Video signals are provided by a line 20 to a transmitter 22. The left, right, and SAP channels are provided to a BTSC encoder 24 that prepares the audio signals for transmission. Specifically, the left and right audio channels are provided to a matrix 26 that calculates a sum signal (e.g., L+R) and a difference signal (e.g., L−R) from the audio signals. Typically operations of matrix 26 are performed by utilizing a digital signal processor (DSP) or similar hardware or software-based techniques known to one skilled in the art of television audio and video signal processing. Once produced, sum and difference signals (i.e., L+R and L−R) are encoder for transmission. In particular, the sum signal (i.e., L+R) is provided to a pre-emphasis unit 28 that alters the magnitude of select frequency components of the sum signal with respect to other frequency components. The alteration may be in a negative sense in which the magnitude of the select frequency components are suppressed, or the alteration may be in a positive sense in which the magnitude of the select frequency components are enhanced.

The difference signal (i.e., L−R) is provided to a BTSC compressor 30 that adaptively filters the signal prior to transmission such that when decoded, the signal amplitude and frequency content suppress noise imposed during transmission. Similar to the difference signal, the SAP signal is provided to a BTSC compressor 32. An audio modulator stage 34 receives the processed sum signal, difference signal, and SAP signal. Additionally, signals from the professional channel are provided to audio modulator stage 34. The four signals are modulated by audio modulator stage 34 and provided to transmitter 22. Along with the video signals provided by the video channel, the four audio signals are conditioned for transmission and provided to an antenna 36 (or an antenna system). Various signal transmitting techniques known to one skilled in the art of television systems and telecommunications may be implemented by transmitter 22 and antenna 36. For example, transmitter 22 may be incorporated into a cable television system, a broadcast television system, or other similar television system.

Figure 2:
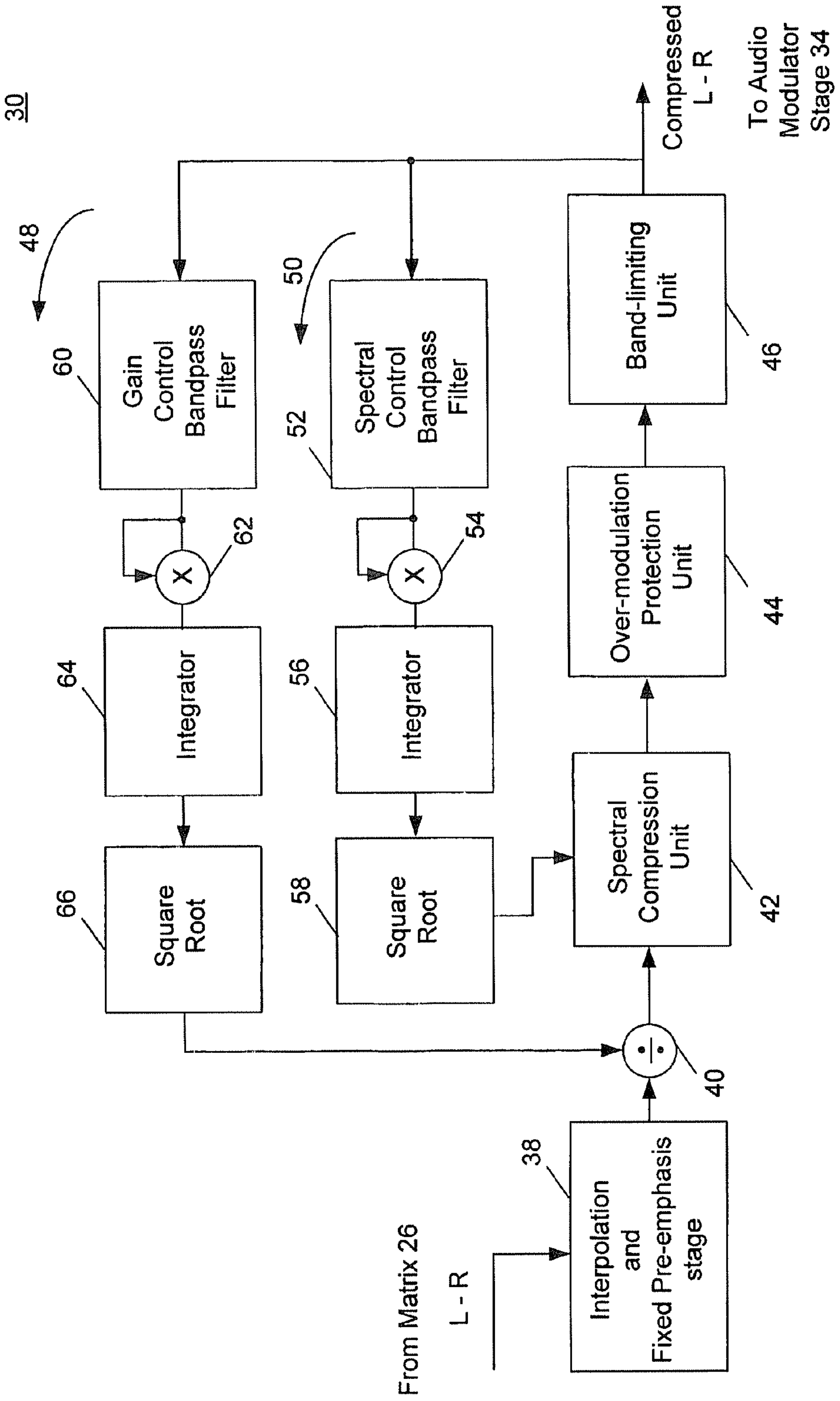
FIG. 2 is a block diagram representing a portion of a BTSC encoder included in the television signal transmission system shown in FIG. 1.

Referring to FIG. 2, a block diagram representing operations performed by a portion of BTSC compressor 30 is shown. In general, the difference channel (i.e., L−R) processing performed by BTSC compressor 30 is considerably more complex than the sum channel (i.e., L+R) processing by pre-emphasis unit 28. The additional processing provided by the difference channel processing BTSC compressor 30, in combination with complementary processing provided by a decoder (not shown) receiving a BTSC signal, maintains the signal-to-noise ratio of the difference channel at acceptable levels even in the presence of the higher noise floor associated with the transmission and reception of the difference channel.

BTSC compressor 30 essentially generates the encoded difference signal by dynamically compressing, or reducing the dynamic range of the difference signal so that the encoded signal may be transmitted through a limited dynamic range transmission path, and so that a decoder receiving the encoded signal may recover substantially all the dynamic range in the original difference signal by expanding the compressed difference signal in a complementary fashion. In some arrangements, BTSC compressor 30 is a particular form of the adaptive signal weighing system described in U.S. Pat. No. 4,539,526, incorporated by reference herein, and which is known to be advantageous for transmitting a signal having a relatively large dynamic range through a transmission path having a relatively narrow, frequency dependent, dynamic range.

The BTSC standard rigorously defines the desired operation of BTSC encoder 24 and BTSC compressors 30 and 32. Specifically, the BTSC standard provides transfer functions and/or guidelines for the operation of each component included e.g., in BTSC compressor 30 and the transfer functions are described in terms of mathematical representations of idealized analog filters. Upon receiving the difference signal (i.e., L−R) from matrix 26, the signal is provided to an interpolation and fixed pre-emphasis stage 38. In some digital BTSC encoders, the interpolation is set for twice the sample rate and the interpolation may be accomplished by linear interpolation, parabolic interpolation, or a filter (e.g., a finite impulse response (FIR) filter, an infinite impulse response (IIR) filter, etc.) of n-th order. The interpolation and fixed pre-emphasis stage 38 also provides pre-emphasis. After interpolation and pre-emphasis, the difference signal is provided to a divider 40 that divides the difference signal by a quantity determined from the difference signal and described in detail below.

The output of divider 40 is provided to a spectral compression unit 42 that performs emphasis filtering of the difference signal. In general, spectral compression unit 42 "compresses", or reduces the dynamic range, of the difference signal by amplifying signals having relatively low amplitudes and attenuating signals having relatively large amplitudes. In some arrangements spectral compression unit 42 produces an internal control signal from the difference signal that controls the pre-emphasis/de-emphasis that is applied. Typically, spectral compression unit 42 dynamically compresses high frequency portions of the difference signal by an amount determined by the energy level in the high frequency portions of the encoded difference signal. Spectral compression unit 42 thus provides additional signal compression toward the higher frequency portions of the difference signal. This is done because the difference signal tends to be noisier in the higher frequency portion of the spectrum. When the encoded difference signal is decoded with a spectral expander in a decoder, respectively in a complementary manner to the spectral compression unit of the encoder, the signal-to-noise ratio of the L−R signal is substantially preserved.

Once processed by spectral compression unit 42, the difference signal is provided to an over-modulation protection unit 44 and band-limiting unit 46. Similar to the other components, the BTSC standard provides suggested guidelines for the operation of over-modulation protection unit 44 and band-limiting unit 46. Generally, band-limiting unit 46 and a portion of over-modulation protection unit 44 may be described as low pass filters. Over-modulation protection unit 44 also performs as a threshold device that limits the amplitude of the encoded difference signal to full modulation, where full modulation is the maximum permissible deviation level for modulating an audio subcarrier in a television signal.

Two feedback paths 48 and 50 are included in BTSC compressor 30. Feedback path 50 includes a spectral control bandpass filter 52 that typically has a relatively narrow pass band that is weighted towards higher audio frequencies to provide a control signal for spectral compression unit 42. To condition the control signal produced by spectral control bandpass filter 52, feedback path 50 also includes a multiplier 54 (configured to square the signal provided by spectral control bandpass filter 52), an integrator 56, and a square root device that provides the control signal to spectral compression unit 42. Feedback path 48 also includes a bandpass filter (i.e., gain control bandpass filter 60) that filters the output signal from band-limiting unit 46 to set the gain applied to the output signal of interpolation and fixed pre-emphasis stage 38 via divider 40. Similar to feedback path 50, feedback path 48 also includes a multiplier 62, an integrator 64, and a square root device 66 to condition the signal that is provided to divider 40.

Figure 3:
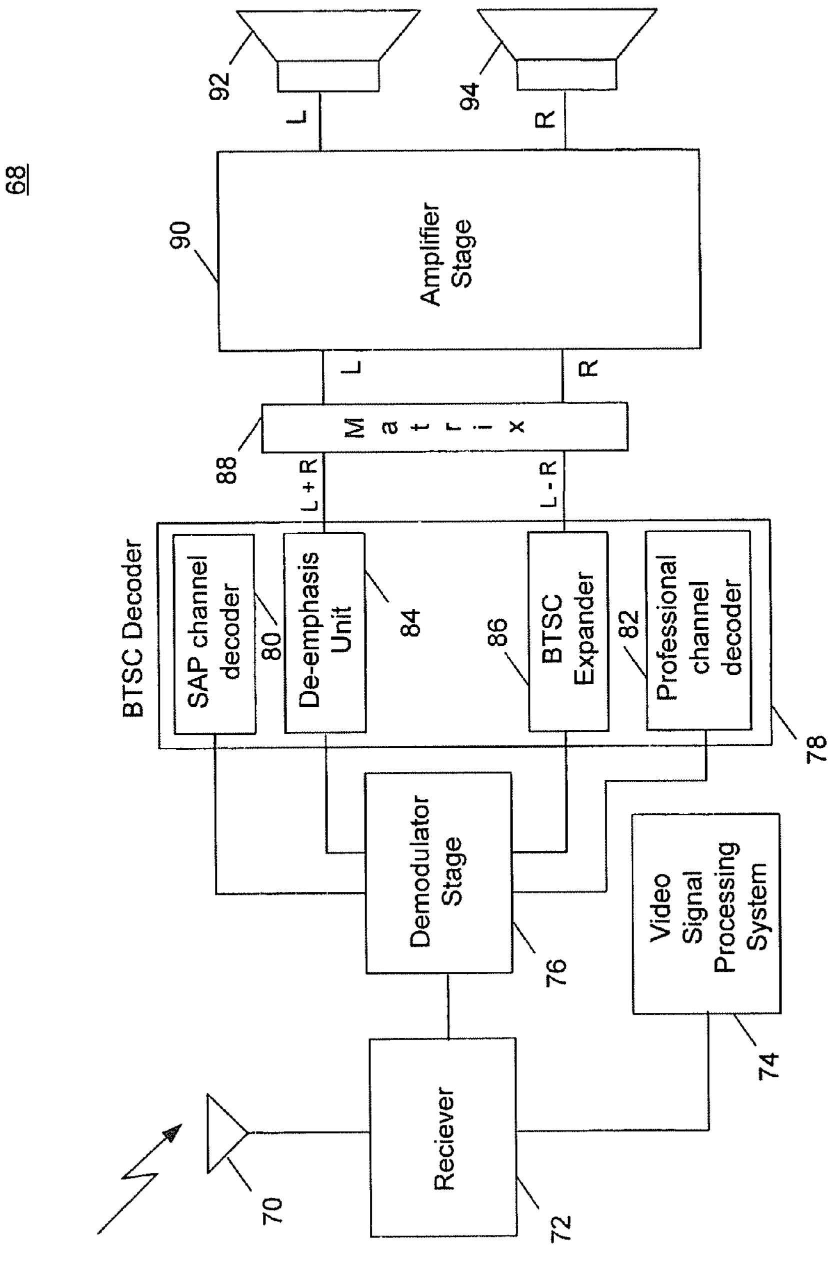
FIG. 3 is a block diagram representing a television receiver system that is configured to receive and decode BTSC television audio signals sent by the television signal transmission system shown in FIG. 1.

Referring to FIG. 3, a block diagram is shown that represents a television receiver system 68 that includes an antenna 70 (or a system of antennas) to receive BTSC compatible broadcast signals from television transmission system 10 (shown in FIG. 1). The signals received by antenna 70 are provided to a receiver 72 that is capable of detecting and isolating the television transmission signals. However, in some arrangements receiver 72 may receive the BTSC compatible signals from another television signal transmission technique known to one skilled in the art of television signal broadcasting. For example, the television signals may be provided to receiver 72 over a cable television system or a satellite television network.

Upon receiving the television signals, receiver 72 conditions (e.g., amplifies, filters, frequency scales, etc.) the signals and separates the video signals and the audio signals out of the transmission signals. The video content is provided to a video processing system 74 that prepares the video content contained in the video signals for presentation on a screen (e.g., a cathode ray tube, etc.) associated with the television receiver system 68. Signals containing the separate audio content are provided to a demodulator stage 76 that e.g., removes the modulation applied to the audio signals at television transmission system 10. The demodulated audio signals (e.g., the SAP channel, the professional channel, the sum signal, the difference signal) are provided to a BTSC decoder 78 that appropriately decodes each signal. The SAP channel is provided a SAP channel decoder 80 and the professional channel is provided to a professional channel decoder 82. After separating the SAP channel and the professional channel, a demodulated sum signal (i.e., L+R signal) is provided to a de-emphasis unit 84 that processes the sum signal in a substantially complementary fashion in comparison to pre-emphasis unit 28 (shown in FIG. 1). Upon de-emphasizing the spectral content of the sum signal, the signal is provided to a matrix 88 for separating the left and right channel audio signals.

The difference signal (i.e., L−R) is also demodulated by demodulation stage 76 and is provided to a BTSC expander 86 included in BTSC decoder 78. BTSC expander 86 complies with the BTSC standard, and as described in detail below, conditions the difference signal. Matrix 88 receives the difference signal from BTSC expander 86 and with the sum signal, separates the right and left audio channels into independent signals (identified in FIG. 3 as "L" and "R"). By separating the signals, the individual right and left channel audio signals may be conditioned and provided to separate speakers. In this example, both the left and right audio channels are provided to an amplifier stage 90 that applies the same (or different) gains to each channel prior to providing the respective signals to a speaker 92 for broadcasting the left channel audio content and another speaker 94 for broadcasting the right channel audio content.

Figure 4:
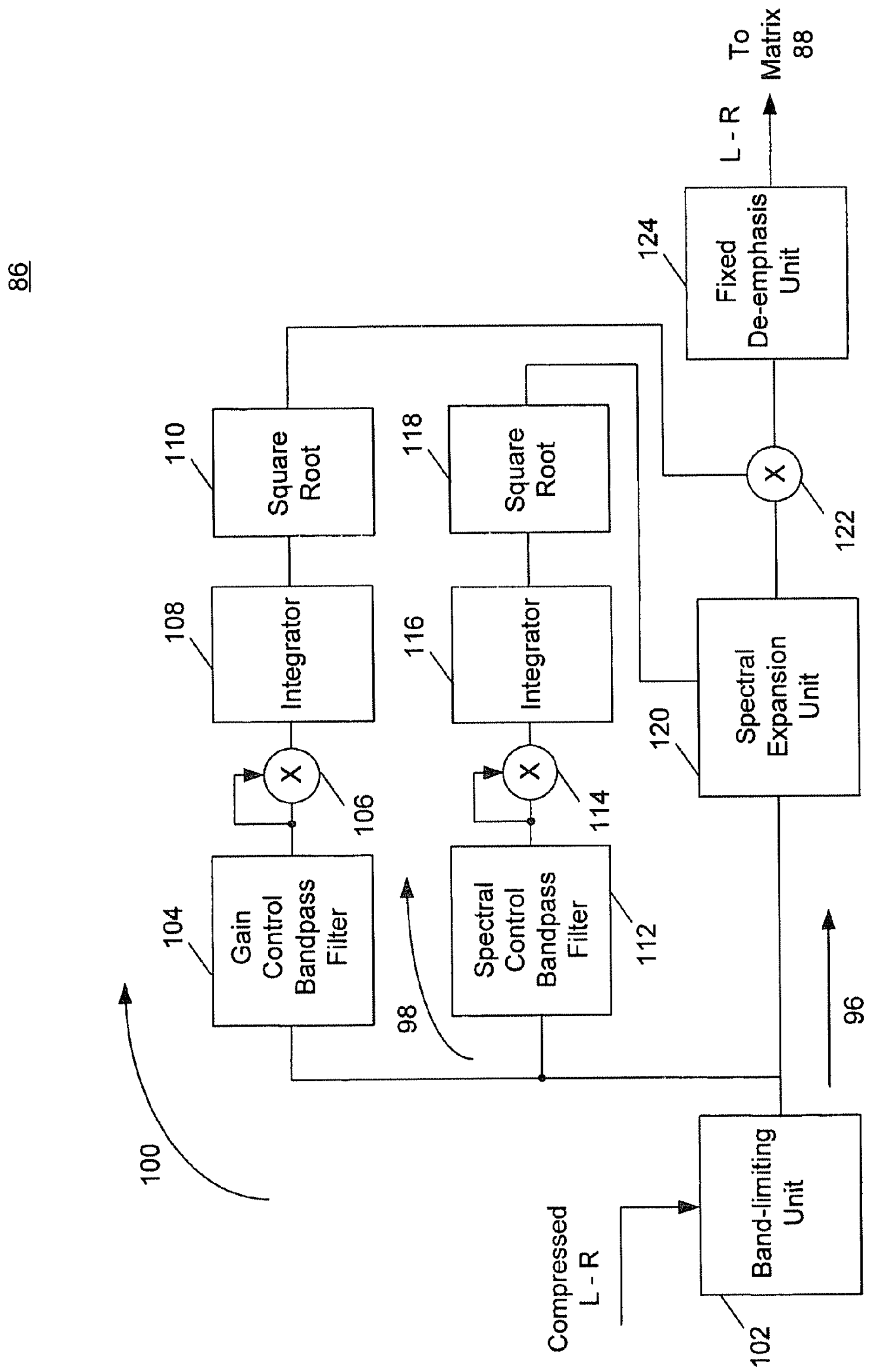
FIG. 4 is a block diagram representing a portion of a BTSC decoder included in the television receiver system shown in FIG. 3.

Referring to FIG. 4, a block diagram identifies some of the operations performed by BTSC expander 86 to condition the difference signal. In general, BTSC expander 86 performs operations that are complementary to the operations performed by BTSC compressor 32 (shown in FIG. 2). In particular, the compressed difference signal is provided to a signal path 96 for un-compressing the signal, and to two paths 98 and 100 that produce a respective control and gain signal to assist the processing of the difference signal. To initiate the processing, the compressed difference signal is provided to a band-limiting unit 102 that filters the compressed difference signal. The band-limiting unit 102 provides a signal to path 98 to produce a control signal and to path 100 to produce a gain signal. Path 100 includes a gain control bandpass filter 104, a multiplier 106 (that squares the output of the gain control bandpass filter), an integrator 108, and a square root device 110. Signal path 98 also receives the signal from band-limiting unit 102 and processes the signal with a spectral control bandpass filter 112, a squaring device 114, an integrator 116, and a square root device 118. Path 98 then provides a control signal to a spectral expansion unit 120 that performs an operation that is complementary to the operation performed by spectral compression unit 42 shown in FIG. 2. The gain signal produced by path 100 is provided to a multiplier 122 that receives an output signal from spectral expansion unit 120. Multiplier 122 provides the spectrally expanded difference signal to a fixed de-emphasis unit 124 that filters the signal in a complementary manner in comparison to filtering performed by BTSC compressor 30. In general, the term “de-emphasis” means the alteration of the select frequency components of the decoded signal in either a negative or positive sense in a complementary manner in which the original signal is encoded.

Both BTSC encoder 24 and BTSC decoder 78 include multiple filters that adjust the amplitude of audio signals as a function of frequency. In some prior art television transmission systems and reception systems, each of the filters are implemented with discrete analog components. However, with advancements in digital signal processing, some BTSC encoders and BTSC decoders may be implemented in the digital domain with one or more integrated circuits (ICs). Furthermore, multiple digital BTSC encoders and/or decoders may implemented on a single IC. For example, encoders and decoders may be incorporated into a single IC as a portion of a very large scale integration (VLSI) system.

A significant portion of the cost of an IC is directly proportional to the physical size of the chip, particularly the size of its ‘die’, or the active, non-packaging part of the chip. In some arrangements filtering operations performed in digital BTSC encoders and decoders may be executed using general purpose digital signal processors that are designed to execute a range of DSP functions and operations. These DSP engines tend to have relatively large die areas, and are thereby costly to use for implementing BTSC encoders and decoders. Additionally the DSP may be dedicated to executing other functions and operations. By sharing the this resource, the processing performed by the DSP may overload and interfere with the processing of the BTSC encoder and decoder functions and operations.

In some arrangements, BTSC encoders and decoders may incorporate groups of basic components to reduce cost. For example, groups of multipliers, adders, and multiplexers may be incorporated to produce the BTSC encoder and decoder functions. However, while the groups of nearly identical components may be easily fabricated, the components represent significant die area and add to the total cost of the IC. Thus, a need exists to reduce the number of duplicated circuits components used to implement a digital BTSC encoder and/or decoder.

Figure 5:
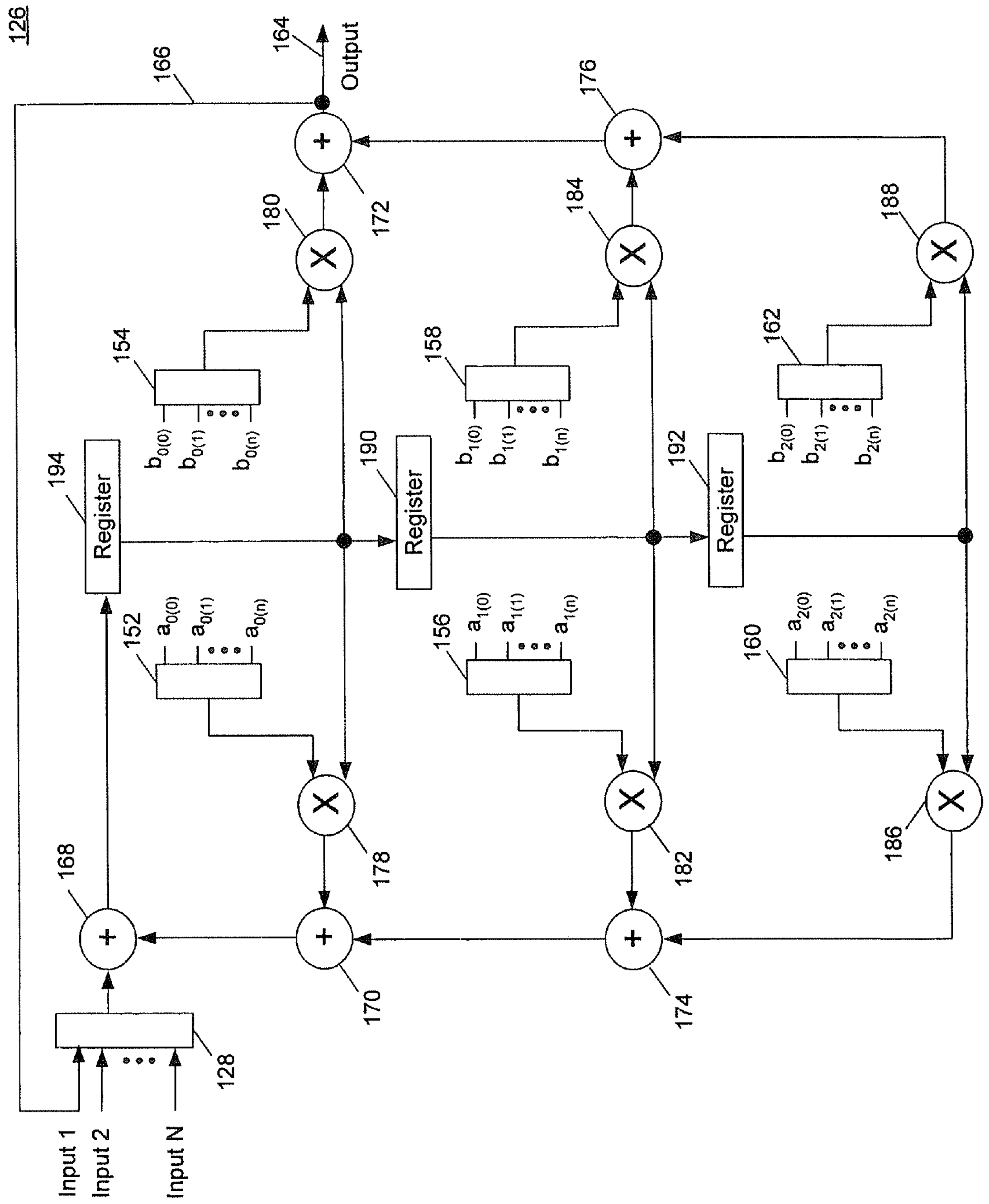
FIG. 5 is a diagrammatic view of a configurable second-order infinite impulse response filter with selectable inputs.

Referring to FIG. 5, a block diagram of a configurable infinite impulse response (IIR) filter 126 is shown that is capable of performing multiple filtering operations for a digital BTSC encoder or decoder. By providing selectable filtering coefficients, configurable IIR filter 126 may be configured for various filtering operations. For example, filtering coefficients may be selected so that configurable IIR filter 126 operates as a low pass filter, a high pass filter, a band pass filter, or other type of filter known to one skilled in the art of filter design. Thus, one or a relatively small number of configurable IIR filters may be used to provide most or all of the filtering needs of a BTSC encoder or a BTSC decoder. By reducing the number of decoder and encoder filters, the implementation area of an IC chip is reduced along with the production cost of the BTSC encoders and decoders.

To allow configurable IIR filter 126 to perform multiple types of filtering operations, the filter includes an input selector 128 that controls which input (e.g., Input 1, Input 2, . . . , Input N) provides an input signal to the filter. Referring briefly to FIG. 2, some of the inputs to selector 128 may be connected to provide input signals for each of the filtering operations performed within BTSC compressor 30. For example, the input to gain control bandpass filter 60 may be connected to input 2 of selector 128. Similarly, the input to spectral control bandpass filter 52 may be connected to another input (e.g., input N) of selector 128. Then, selector 128 may control which particular filtering operation is performed by configurable IIR filter 126. For example, during one time period, one input (e.g., input 2) may be selected and configurable IIR filter 126 is configured to provide the filtering function of gain control bandpass filter 60. Then, at another time period, selector 128 is used to select another input (e.g., input N) to perform a different filtering operation. Along with selecting the other input (e.g., input N), configurable IIR filter 126 is also configured to provide the different type of filtering function, such as the filtering provided by spectral control bandpass filter 52.

In order to perform multiple filtering operations e.g., for a BTSC compressor or a BTSC expander, configurable IIR filter 126 operates at a clock speed substantially faster than the other portions of the digital compressor or expander. By operating at a faster clock speed, configurable IIR filter 10 may perform one type of filtering without causing other operations of the digital compressor or expander to be delayed. For example, by operating configurable IIR filter 126 at a substantially fast clock speed, the filter may first be configured to perform filtering for gain control bandpass filter 60 without substantially delaying the execution of the next filter configuration (e.g., filter operations for spectral control bandpass filter 52).

Figure 6:
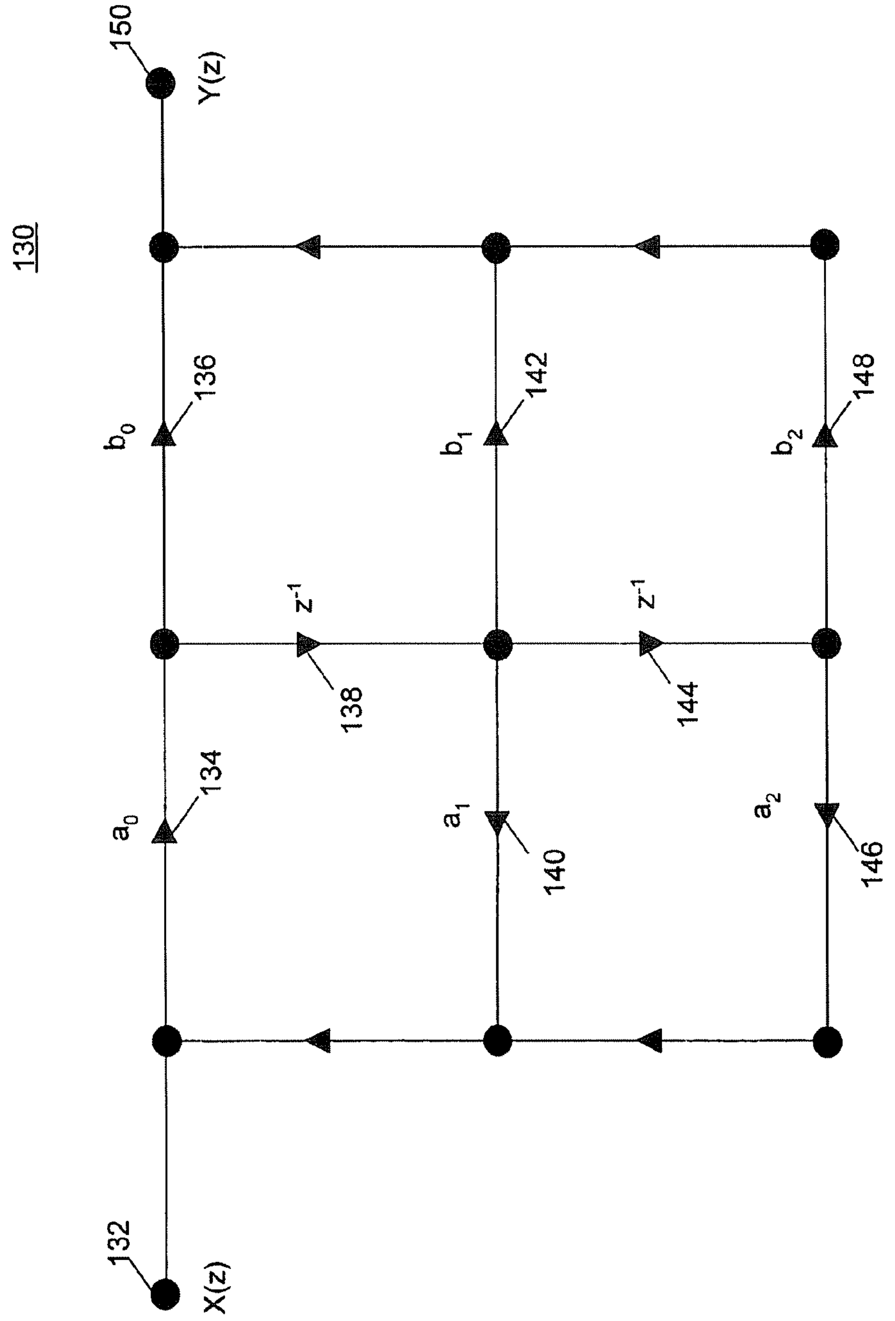
FIG. 6 is a graphical representation of a transfer function of the second-order infinite impulse response filter shown in FIG. 5.

In this particular arrangement, configurable IIR filter 126 is implemented as a second-order IIR filter. Referring to FIG. 6, a z-domain signal flow diagram 130 is presented for a typical second-order IIR filter. An input node 132 receives an input signal identified as X(z). The input signal is provided to a gain stage 134 that applies a filter coefficient $a_0$ to the input signal. In some applications the filter coefficient $a_0$ has a unity value. Similarly, a filter coefficient $b_0$ is applied to the input signal at gain stage 136. At a delay stage 138, a time delay (i.e., represented in the z-domain as $z^{-1}$) is applied as the input signal enters the first-order portion of the filter and filter coefficients $a_1$ and $b_1$ are applied at respective gain stages 140 and 142. A second delay (i.e., $z^{-1}$) is applied at delay stage 144 for producing the second-order portion of filter 130 and filter coefficients $a_2$ and $b_2$ are applied at respective gain stages 146 and 148. The filtered signal is provided to an output node 150 such that output signal Y(z) may be determined from the transfer function H(z) of the second-order filter 130, as described in the following Equation (1):

$$H(z) = \frac{b_0 + b_1 z^{-1} + b_2 z^{-2}}{a_0 + a_1 z^{-1} + a_2 z^{-2}}$$

Each of the coefficients (i.e., $b_0$, $a_0$, $b_1$, $a_1$, $b_2$, and $a_2$) included in the transfer function may be assigned particular values to produce a desired type of filter. For example, particular values may be assigned to the coefficients to produce a low-pass filter, a high-pass filter, or a band-pass filter, etc. Thus, by providing the appropriate values for each coefficient, the type and characteristics (e.g., pass band, roll-off, etc) of the second-order filter may be configured and re-configured into another type of filter (dependent upon the application) with a different set of coefficients. While this example describes a second-order filter, in other arrangements an $n^{th}$-order filter may be implemented. For example, higher order (e.g. third-order, fourth-order, etc.) filters or lower order (e.g., first-order filters) may be implemented. Furthermore, for some applications, filters of the same or different orders may be cascaded to produce an $n^{th}$-order filter.

Referring back to FIG. 5, along with using selector 128 to select a particular input for configurable IIR filter 126, the coefficients used by the filter are selected to implement different types of filters and to provide particular filter characteristics. For example, coefficients may be selected to implement a low-pass filter, a high-pass filter, a band-pass filter, or other similar type of filter used to encode or decode BTSC audio signals. In this example, respective selectors 152, 154, 156, 160 and 162 are used to select each coefficient for the second-order configurable filter 126. For example, selector 152 provides the $a_0$ coefficient of the second-order filter from a group of "n" coefficients (i.e., $a_{0(0)}$, $a_{0(1)}$, $a_{0(2)}$, . . . , $a_{0(n)}$) dependent upon the filter type and filter characteristics. Similarly, selectors 154-162 also select from respective groups of coefficient values to implement the filters. By providing these selectable coefficients values, configurable IIR filter 126 may be configured to provide filters for both encoding and decoding operations. Returning to the previous example, if selector 128 is placed in a position to select input 2 (i.e., the input for gain control bandpass filter 60), selectors 152-162 select the respective coefficients (e.g., $a_{0(0)}$, $b_{0(0)}$, $a_{1(0)}$, $b_{1(0)}$) $b_{2(0)}$, $a_{2(0)}$) so that IIR filter 126 is configured into the appropriate filter type with characteristics to perform as the gain control bandpass filter. Upon completing the filtering, selector 128 may then be placed in a position to provide signals present on input N to configurable IIR filter 126. Still using the previous example, input N of selector 128 may provide the input signal destined for spectral control bandpass filter 52. By selecting this input, new filter coefficients may be selected to provide the particular filter type and filter characteristics needed to perform the filtering of spectral control bandpass filter 52. To provide this filter and filter characteristics, selectors 152-162 may be respectively select filter coefficients (e.g., $a_{0(1)}$, $b_{0(1)}$, $a_{1(1)}$, $b_{1(1)}$, $a_{2(1)}$ and $b_{2(1)}$) associated with the filter type and characteristics of spectral control bandpass filter 52.

In this example, configurable IIR filter 126 is a second-order filter, however, some encoding and/or decoding filtering applications may call for a higher order filter. To provide higher order filters, in this example, one input of selector 128 is connected to an output 164 of IIR filter 126 to form a feed-back path. By providing the output of the IIR filter back to the input, filtered output signals may pass through the IIR filter multiple times using the same (or different) filter coefficients. Thus, signals may be passed through the second-order IIR filter 126 more than one time to produce a higher-order. In this particular example, a conductor 166 provides a feedback path from output 164 of configurable IIR filter 126 to input 1 of selector 128.

Various techniques and components known to one skilled in the art of electronics and filter design may be used to implement selector 128 and selectors 152-162. For example, selector 128 may be implemented by one or more multiplexers to select among the input lines (i.e., Input 1, Input 2, . . . , Input N). Multiplexers or other types digital selection devices may be implemented as one or more of selectors 152-162 to select appropriate filter coefficients. Various coefficient values may be used to configure IIR filter 126. For example, coefficients described in U.S. Pat. No. 5,796,842 to Hanna, which is herein incorporated by reference, may be used by configurable IIR filter 126. In some arrangements, the filter coefficients are stored in a memory (not shown) associated with the BTSC encoder or decoder and are retrieved by selectors 152-162 at appropriate times. For example, the coefficients may be stored in a memory chip (e.g., random access memory (RAM), read-only memory (ROM), etc.) or another type of storage device (e.g., a hard-drive, CD-ROM, etc.) associated with the BTSC encoder or decoder. The coefficients may also be stored in various software structures such as a look-up table, or other similar structure.

Configurable second-order IIR filter 126 also includes respective adding devices 168, 170, 172, 174 and 176 are included in configurable IIR filter 126 along with multipliers 178, 180, 182, 184, 186 and 188 that apply the filter coefficients to signal values. Various techniques and/or components known to one skilled in the art of electronic circuit design and filter design may be used to implement adding devices 168-176 and multipliers 178-188 included in configurable IIR filter 126. For example, logic gates such as one or more "AND" gates may be implemented as each of the multipliers. To introduce time delays that correspond to delay stages 138 and 144 (shown in FIG. 6), registers 190 and 192 provide delays by storing and holding the digitized input signal values for an appropriate number of clock cycles during the filtering process. Additionally, another register 194 is included configurable IIR filter 126 to initially store input signal values.

In this example, configurable IIR filter 126 is implemented with hardware components, however, in some arrangements one or more operational portions of the filter may be implemented in software. One exemplary listing of code that performs the operations of configurable IIR filter 126 is presented in appendix A. The exemplary code is provided in Verilog, which, in general, is a hardware description language that is used by electronic designers to describe and design chips and systems prior to fabrication. This code may be stored on and retrieved from a storage device (e.g., RAM, ROM, hard-drive, CD-ROM, etc.) and executed on one or more general purpose processors and/or specialized processors such as a dedicated DSP.

Figure 7:
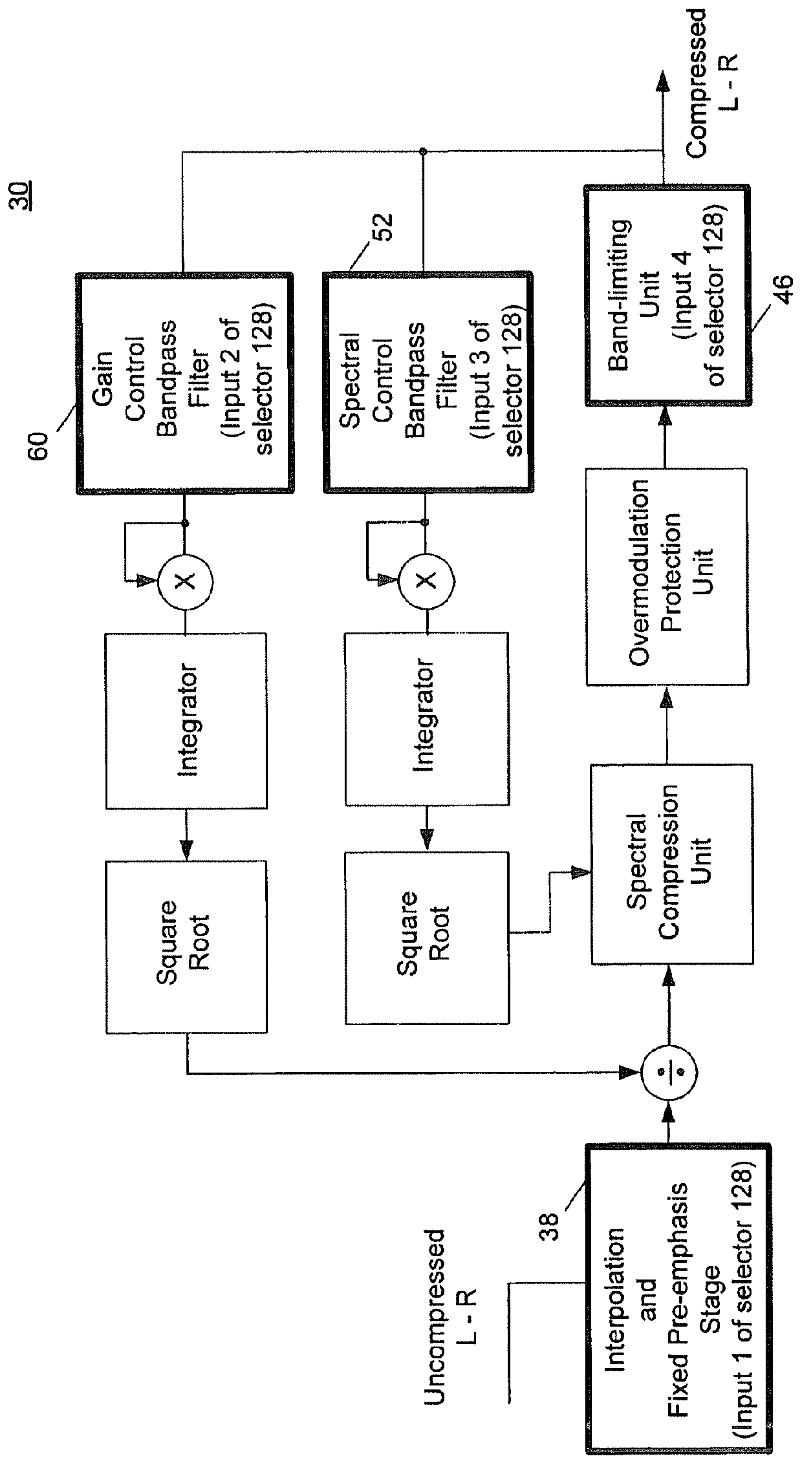
FIG. 7 is a block diagram of a portion of a BTSC encoder that highlights operations that may be performed by the configurable second-order infinite impulse response filter shown in FIG. 5.

Referring to FIG. 7, a block diagram of BTSC compressor 30 is provided in which portions of the diagram are highlighted to illustrate functions that may be performed by a single (or multiple) configurable IIR filters such as configurable IIR filter 126. In particular, filtering performed by interpolation and fixed pre-emphasis stage 38 may be performed by configurable IIR filter 126. For example, input 1 of selector 128 may be connected to the appropriate filter input within interpolation and fixed pre-emphasis stage 38. Correspondingly, when input 1 of selector 128 is selected, filter coefficients may be retrieved from memory and used to produce to an appropriate filter type and filter characteristics. Similarly, gain control bandpass filter 60 may be assigned to input 2 of selector 128 in configurable IIR filter 126 and spectral control bandpass filter 52 may be assigned to a third input of selector 128. Band-limiting unit 46 may be assigned to a fourth input of selector 128. For each of these selectable inputs, corresponding filter coefficients are stored (e.g., in memory) and may be retrieved by selectors 152-162 of configurable IIR filter 126. In this example, filtering associated with four portions of BTSC compressor 30 is selectively performed by configurable IIR filter 126, however, in other arrangements, more or less filtering operations of the compressor may be performed by the configurable IIR filter.

Figure 8:
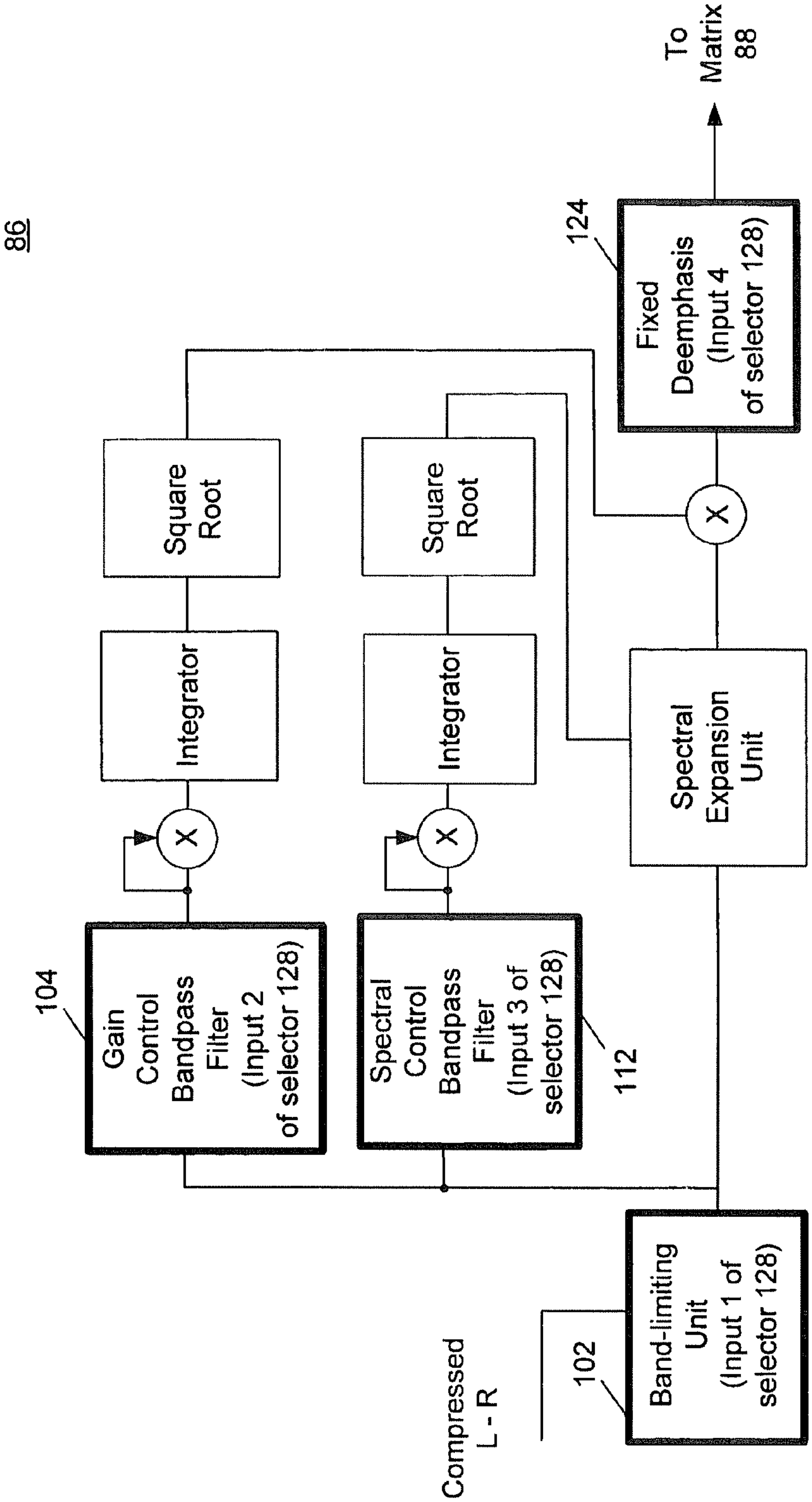
FIG. 8 is a block diagram of a portion of a BTSC decoder that highlights operations that may be performed by the configurable second-order infinite impulse response filter shown in FIG. 5.

Referring to FIG. 8, portions of BTSC expander 86 are highlighted to identify filtering operations that may be performed by one or more configurable IIR filters such as configurable IIR filter 126. For example, filtering associated with band-limiting unit 102 may be performed by configurable IIR filter 126. In particular, input 1 of selector 128 may be assigned to band-limiting unit 102 such that when input 1 is selected, appropriate filtering coefficients are retrieved and used by IIR filter 126. Similarly, filtering associated with gain control bandpass filter 104 (assigned to a second input of selector 128), spectral control bandpass filter 112 (assigned to a third input of selector 128), and fixed de-emphasis unit 124 (assigned to a fourth input of selector 128) is consolidated onto configurable IIR filter 126.

While the previous example described using configurable IIR filter 126 with BTSC encoders and BTSC decoders, encoders and decoders that comply with television audio standards may implement the configurable IIR filter. For example, encoders and/or decoders associated with the Near Instantaneously Companded Audio Multiplex (NICAM), which is used in Europe, may incorporate one or more configurable IIR filters such as IIR filter 126. Similarly, encoders and decoders implementing the A2/Zweiton television audio standard (currently used in parts of Europe and Asia) or the Electronics Industry Association of Japan (EIA-J) standard may incorporate one or more configurable IIR filters.

While the previous example described using configurable IIR filter 126 to encode and decoder a difference signal produced from right and left audio channel, the configurable IIR filter may be used to encode and decode other audio signals. For example, configurable IIR filter 126 may be used to encode and/or decode an SAP channel, a professional channel, a sum channel, or one or more other individual or combined types of television audio channels.

A number of implementations have been described. Nevertheless, it will be understood that various modifications may be made. Accordingly, other implementations are within the scope of the following claims.

What is claimed is:

1. A television audio signal encoder, comprising:

a matrix configured to sum a left channel audio signal and a right channel audio signal to produce a sum signal, and to subtract one of the left and right audio signals from the other of the left and right signals to produce a difference signal; and a configurable infinite impulse response digital filter configured to selectively use one or more sets of filter coefficients for the difference signal, wherein the configurable infinite impulse response digital filter includes one or more second-order IIR filter building blocks, wherein each selectable set of filter coefficients is associated with a unique filtering application to prepare the difference signal for transmission, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter.

2. The television audio signal encoder of claim 1, wherein the selector is configured to select one of the one or more sets of filter coefficients.

3. The television audio signal encoder of claim 1, wherein the configurable infinite impulse response digital filter is configured as a low pass filter.

4. The television audio signal encoder of claim 1, wherein the configurable infinite impulse response digital filter is configured as a high pass filter.

5. The television audio signal encoder of claim 1, wherein the configurable infinite impulse response digital filter is configured as a band pass filter.

6. The television audio signal encoder of claim 1, wherein the configurable infinite impulse response digital filter is configured as an emphasis filter.

7. The television audio signal encoder of claim 1, wherein selection of the one or more sets of filter coefficients is based on a rate that the television audio signal is sampled.

8. The television audio signal encoder of claim 1, wherein the sets of filter coefficients are stored in a memory.

9. The television audio signal encoder of claim 1, wherein the sets of filter coefficients are stored in a look-up table.

10. The television audio signal encoder of claim 1, wherein the television audio signal complies to the Broadcast Television System Committee (BTSC) standard.

11. The television audio signal encoder of claim 1, wherein the television audio signal complies to the Near Instantaneously Companded Audio Multiplex (NICAM) standard.

12. The television audio signal encoder of claim 1, wherein the television audio signal complies to the A2/Zweiton standard.

13. The television audio signal encoder of claim 1, wherein the television audio signal complies to the EIA-J standard.

14. The television audio signal encoder of claim 1, wherein the configurable infinite impulse response digital filter is implemented in an integrated circuit.

15. A television audio signal decoder, comprising:

a configurable infinite impulse response digital filter configured to selectively use one or more sets of filter coefficients for a difference signal, wherein the configurable infinite impulse response digital filter includes one or more second-order IIR filter building blocks, wherein the difference signal is produced by subtracting one of a left channel and a right channel audio signal from the other of the left channel and right channel audio signal, each selectable set of filter coefficients is associated with a unique filtering application to prepare the difference signal for separating the left channel and right channel audio signals, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter; and a matrix configured to separate the left channel and right channel audio signals from the difference signal and a sum signal, wherein the sum signal includes the sum the left channel audio signal and the right channel audio signal.

16. The television audio signal decoder of claim 15, wherein the selector is configured to select one of the one or more sets of filter coefficients.

17. The television audio signal decoder of claim 15, wherein the configurable infinite impulse response digital filter is configured as a low pass filter.

18. The television audio signal decoder of claim 15, wherein the configurable infinite impulse response digital filter is configured as a high pass filter.

19. The television audio signal decoder of claim 15, wherein the configurable infinite impulse response digital filter is configured as a band pass filter.

20. The television audio signal decoder of claim 15, wherein the configurable infinite impulse response digital filter is configured as an emphasis filter.

21. The television audio signal decoder of claim 15, wherein selection of the one or more sets of filter coefficients is based on a rate that the television audio signal is sampled.

22. The television audio signal decoder of claim 15, wherein the sets of filter coefficients are stored in a memory.

23. The television audio signal decoder of claim 15, wherein the sets of filter coefficients are stored in a look-up table.

24. The television audio signal encoder of claim 15, wherein the television audio signal complies to the Broadcast Television System Committee (BTSC) standard.

25. The television audio signal encoder of claim 15, wherein the television audio signal complies to the Near Instantaneously Companded Audio Multiplex (NICAM) standard.

26. The television audio signal encoder of claim 15, wherein the television audio signal complies to the A2/Zweiton standard.

27. The television audio signal encoder of claim 15, wherein the television audio signal complies to the EIA-J standard.

28. The television audio signal encoder of claim 15, wherein the configurable infinite impulse response digital filter is implemented in an integrated circuit.

29. A digital BTSC signal encoder for encoding digital left and right channel audio signals so that the encoded left and right channel audio signals can be subsequently decoded so as to reproduce the digital left and right channel audio signals with little or no distortion of the signal content of the digital left and right channel audio signals, the encoder comprising:

a matrix configured to sum the left channel audio signal and the right channel audio signal to produce a sum signal, and to subtract one of the left and right audio signals from the other of the left and right signals to produce a difference signal; and a configurable infinite impulse response digital filter configured to selectively use one or more sets of filter coefficients for the difference signal, wherein the configurable infinite impulse response digital filter includes one or more second-order IIR filter building blocks, wherein each selectable set of filter coefficients is associated with a unique filtering application to prepare the difference signal for transmission and comply with the BTSC standard, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter.

30. The digital BTSC signal encoder of claim 29, wherein the selector is configured to select one of the one or more sets of filter coefficients.

31. The digital BTSC signal encoder of claim 29, wherein the configurable infinite impulse response digital filter is configured as a low pass filter.

32. The digital BTSC signal encoder of claim 29, wherein the configurable infinite impulse response digital filter is configured as a high pass filter.

33. The digital BTSC signal encoder of claim 29, wherein the configurable infinite impulse response digital filter is configured as a band pass filter.

34. The digital BTSC signal encoder of claim 29, wherein the configurable infinite impulse response digital filter is configured as an emphasis filter.

35. The digital BTSC signal encoder of claim 29, wherein selection of the one or more sets of filter coefficients is based on a rate that the television audio signal is sampled.

36. The digital BTSC signal encoder of claim 29, wherein the sets of filter coefficients are stored in a memory.

37. The digital BTSC signal encoder of claim 29, wherein the sets of filter coefficients are stored in a look-up table.

38. A digital BTSC signal decoder for decoding digital left and right channel audio signals with little or no distortion of the signal content of the digital left and right channel audio signals, the decoder comprising:

a configurable infinite impulse response digital filter configured to selectively use one or more sets of filter coefficients for a difference signal that complies with the BTSC standard, wherein the configurable infinite impulse response digital filter includes one or more second-order IIR filter building blocks, wherein the difference signal is produced by subtracting one of a left channel and a right channel audio signal from the other of the left channel and right channel audio signal, each selectable set of filter coefficients is associated with a unique filtering application to prepare the difference signal for separating the left channel and right channel audio signals, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter; and a matrix configured to separate the left channel and right channel audio signals from the difference signal and a sum signal, wherein the sum signal includes the sum the left channel audio signal and the right channel audio signal.

39. The digital BTSC signal decoder of claim 38, wherein the selector is configured to select one of the one or more sets of filter coefficients.

40. The digital BTSC signal decoder of claim 38, wherein the configurable infinite impulse response digital filter is configured as a low pass filter.

41. The digital BTSC signal decoder of claim 38, wherein the configurable infinite impulse response digital filter is configured as a high pass filter.

42. The digital BTSC signal decoder of claim 38, wherein the configurable infinite impulse response digital filter is configured as a band pass filter.

43. The digital BTSC signal decoder of claim 38, wherein the configurable infinite impulse response digital filter is configured as an emphasis filter.

44. The digital BTSC signal decoder of claim 38, wherein selection of the one or more sets of filter coefficients is based on a rate that the television audio signal is sampled.

45. The digital BTSC signal decoder of claim 38, wherein the sets of filter coefficients are stored in a memory.

46. The digital BTSC signal decoder of claim 38, wherein the sets of filter coefficients are stored in a look-up table.

47. A television audio signal encoder, comprising:

an input stage configured to receive a secondary audio programming signal; and a configurable infinite impulse response digital filter configured to selectively use one or more sets of filter coefficients for the secondary audio programming signal, wherein the configurable infinite impulse response digital filter includes one or more second-order IIR filter building blocks, wherein each selectable set of filter coefficients is associated with a unique filtering application to prepare the secondary audio programming signal for transmission, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter.

48. The television audio signal encoder of claim 47, wherein the selector is configured to select one of the one or more sets of filter coefficients.

49. A television audio signal decoder, comprising:

a configurable infinite impulse response digital filter configured to selectively use one or more sets of filter coefficients for a secondary audio programming signal, wherein the configurable infinite impulse response digital filter includes one or more second-order IIR filter building blocks, and wherein each selectable set of filter coefficients is associated with a unique filtering application to prepare the secondary audio programming signal for a television receiver system, wherein the configurable infinite impulse response digital filter includes a selector configured to select an input signal for said configurable infinite impulse response digital filter from a group of input signals, and wherein one input signal from the group of input signals includes an output signal of the configurable infinite impulse response digital filter.

50. The television audio signal decoder of claim 49, wherein the selector is configured to select one of the one or more sets of filter coefficients.

* * * * *